Jan. 10, 1967     C. E. ANDERSON     3,297,299
GATE VALVE SEAT SKIRT
Filed June 30, 1964     2 Sheets-Sheet 1

INVENTOR.
CLIFFORD E. ANDERSON
BY
AGENT

Jan. 10, 1967   C. E. ANDERSON   3,297,299
GATE VALVE SEAT SKIRT
Filed June 30, 1964   2 Sheets-Sheet 2

INVENTOR.
CLIFFORD E. ANDERSON
BY
AGENT

United States Patent Office 3,297,299
Patented Jan. 10, 1967

3,297,299
GATE VALVE SEAT SKIRT
Clifford E. Anderson, Houston, Tex., assignor to ACF Industries Incorporated, New York, N.Y., a corporation of New Jersey
Filed June 30, 1964, Ser. No. 379,292
8 Claims. (Cl. 251—327)

This invention relates generally to valves, and more particularly to gate valves, having structure to maintain precise alignment between the reciprocable gate member and the annular seat members thereof.

Gate valves, particularly through conduit gate valves, which when opened present an unbroken smooth wall conduit for uninterrupted passage of flow therethrough, are widely used because of their desirable flow characteristics. When in the open position, the straight through passage, which is provided by a through conduit type gate valve, offers no more appreciable resistance to fluid flow than an equal length of equal diameter pipe. Although good flow characteristics are important, an even more important aspect of any valve is its ability to seal. While in certain installations it is only necessary for a valve to stop flow from passing out of the downstream side, there are other installations where it is necessary that the valve controls flow on the upstream side as well as the downstream side of the valve. For example, upstream and downstream seals are necessary for block and bleed service, i.e., service where pressure is bled from the valve chamber with the upstream and downstream seats in sealing contact to indicate leakage past either seat.

In order to provide both an upstream and downstream seal when employing a gate type sealing element, either movement of the seat members into sealing contact with the gate or movement of the gate into sealing contact with the seats must occur. Where movable seats are employed, generally a slab type gate is engaged by the seats upon movement thereof in response to line pressure. This type of sealing arrangement is known in the industry as "pressure actuated seats." Another sealing arrangement is known in the industry as an "expanding gate" and is generally employed with stationary seats. An "expanding gate" may be formed of two or more parts allowing lateral expansion of the sealing surfaces of the gate into sealing contact with stationary seat members.

In gate valves, particularly through conduit type gate valves, it is important that the port through the gate be accurately aligned with the through passage of the valve. Many high speed pipelines of both large and small dimension are in use throughout the world in fluid transportation industries. It is imperative that the flow passages of the valves for controlling the flow of fluid through these high speed pipelines be smooth and unrestricted to prevent the development of turbulence in the flow of fluid, which causes back pressure and otherwise restricts the amount of possible fluid flow. In the petroleum industry particularly, pipelines frequently become coated with a deposit from the petroleum such as paraffin, for example, and these deposits effectively reduce flow of fluid through the line. Cleaning of these pipelines is accomplished by forcing a cleaning device called a "pig" or "ball" through the line ahead of the transported fluid to scrape the deposited material from the walls of the pipe. Since the cleaning devices must pass through the valves in the pipeline, the valves must not have obstructions such as would be caused by a misaligned gate. If the "pig" should become lodged in a valve, because of a misaligned gate or other obstruction, it is possible that the line and valve could be severely damaged. It is, therefore, required that there be provided structure on either the seat, gate, or valve body to positively assure vertical and sidewise alignment of the gate. Vertical alignment of the gate is easily controlled by merely placing a stop in the path of the gate which is engaged by the gate to positively align the gate vertically with respect to the valve through passage. It has been a general practice in the past to provide each of the seat members with integral guide flanges which encompass the width of the gate member to prevent sidewise movement of the same. The manufacture of these integral seat and guide flange constructions is quite expensive, however, because expensive manufacturing operations are required to produce the desired construction. The seat structures were first forged or machined to the desired rough shape and then milled to form the guide flanges. Obviously forging and/or milling operations to produce a combination valve seat and valve guide are very expensive, thus resulting in extremely high valve costs.

To eliminate the high cost of the above described forging and milling operations involved in producing a combination seat member and guide member, separate seat members and guide members were produced. The seat members including one or more annular ringlike parts could be produced on a lathe or screw machine resulting in low manufacturing cost of the seat member itself. Face sealing and back face sealing surfaces of the annular seat members could be surface ground in groups utilizing a magnetic table for support, thus further reducing manufacturing cost. A gate guide member was stamped from thin metal sheet material and formed with a circular opening allowing the guide member to fit and be retained on the circular periphery of the seat member. Stamping of this part which was previously milled, obviously reduced manufacturing cost of the valve.

While the newly designed low cost gate guide member was reliable as far as accurate lateral positioning of the gate is concerned, it was found, upon disassembly of a number of valves in which this type of guide was employed, that the guides had become dislodged from the seat members and had moved into the path of the gate member where they were contacted and crushed by the gate. The gate guide of the type described above, being formed of relatively light sheet stock, is readily crushed or otherwise mutilated by the gate if it is allowed to be contacted by the gate as described above.

Damage to the gate guide members also occur when installing the seats, guides, and gate in the valve body. Due to the construction of a top entry type gate valve, the seats during installation will be inserted into the seat recesses and then the guide members will be positioned on the seats. The seats and valve guide members in this condition will be unsupported prior to installation of the gate and bonnet and in the installation of the gate and bonnet it is difficult to prevent dislodgement of one or both of the guide members. It is also difficult to detect a misaligned guide until the bonnet assembly is completely assembled. When a guide becomes dislodged, a portion of the guide may move into the path of the gate where it might be contacted by the gate and crushed. A damaged gate guide member may also cause gouging or scoring of the gate or seats resulting in costly replacement and repair.

Although stamped gate guides are inexpensive in relation to the cost of the valve, the labor costs involved in their replacement is considerable. Frequently, to eliminate excessive down time on the line, a valve will be repaired in place, especially if the valve is welded into line. In this type of "field" repair, the through conduit may be positioned vertically placing one guide member above the other. In this position, the upper guide member, because it is retained on the seat only due to the closeness of the fit between the guide and seat, may easily become misaligned during installation of the gate and bonnet.

Since the valve is partially closed during installation of the gate and bonnet, faulty guide alignment cannot be visually detected. Excessive down time on the line caused by unwarranted valve damage of this nature obviously can cause extremely high production losses.

Misalignment of a guide member of the type described above may also occur during normal operation of the valve even if the guides have been correctly installed. If the lower portion of one of the guides should become dislodged from its seat due to vibration, seat movement, line pressure, etc., when the gate is in its uppermost position, the lower portion of the gate may contact the curved portion of the guide defined by the circular opening in the guide. Downward movement of the gate with the guide in such a misaligned position would result in damage to the guide if not damage to the gate and seat members.

With the foregoing in mind, the present invention was conceived and developed to eliminate any possibility of guide misalignment either during installation or normal operation.

It is, therefore, an object of this invention to provide a gate valve incorporating separate seat and valve guide members, which will not become misaligned during installation or operation of the same.

A further object of this invention to provide a through conduit gate valve having valve guide members which may be installed regardless of the position of the valve.

It is an object of this invention to provide a through conduit gate valve employing sealing members and gate guide members which prevent installation of the gate into the valve chamber unless the guide members are properly in place.

An object of this invention contemplates the provision of a through conduit gate valve having valve guide members which are inexpensive in manufacture and reliable in use.

Other and further objects of the invention will be obvious upon an understanding of the illustrative embodiments about to be described, or will be indicated in the appended claims, and various advantages not referred to herein will occur to one skilled in the art upon employment of the invention in practice.

Briefly, the invention comprises a through conduit type gate valve incorporating novel gate guide members which prevent misalignment of the gate member and the through passages of the valve both during assembly and during normal valve operation.

A preferred embodiment of the invention has been chosen for purposes of illustration and description and is shown in the accompanying drawing, forming a part of the specification wherein.

Figure 1:
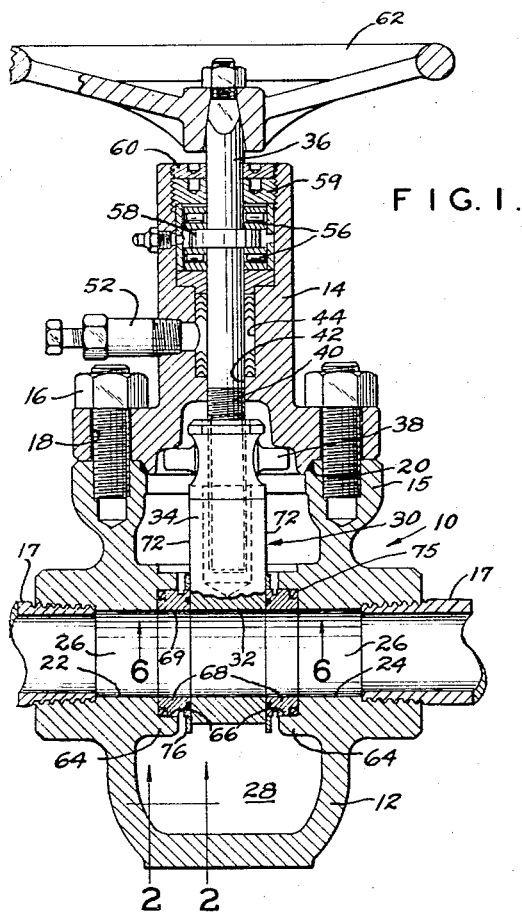
FIGURE 1 is an elevational view in section illustrating a gate valve in accordance with this invention.

Referring now to the drawings for a better understanding of the invention, a through conduit gate valve 10 is shown in FIGURE 1, which comprises a valve body assembly 12 and a bonnet assembly 14. The bonnet assembly is fixed to an upper flange portion 15 of the valve body by a series of bolts 16, which are threaded into the body and which extend through openings 18 in the bonnet 14. An annular sealing member 20 is positioned between the body and the bonnet to establish a fluid-tight seal therebetween. The valve body 12 is provided with through ports 22 and 24, which define a bore 26 and which may be internally threaded, as illustrated in FIGURE 1, for threaded connection to a piping system 17. The valve may be connected to a piping system by welding, by flange connection, or any of the various well-known methods of attachment without departing from the spirit or scope of this invention. A valve chamber 28 is formed within the valve body 12 and intersects the bore 26 for communication between the valve chamber and the bore. A gate member 30, which may be either a slab type gate as illustrated or an expanding type gate, is positioned within the valve chamber 28 and is reciprocable from a position where the bore 26 is fully open to a position fully closing the bore 26.

The gate member 30 consists of a substantially flat metal plate having a through passage 32 formed therein which is adapted to register with the bore 26 in the valve body 12 to provide a continuous flow path in the open position and a solid portion 32 which blocks the bore 26 in the closed position. The passage 32 in registering with the bore 26 forms an unbroken smooth walled conduit for the uninterrupted passage of fluid therethrough, which offers no more appreciable resistance to flow than an equal length of equal diameter pipe. The upper portion of the gate member 30 is attached to means, such as the stem 36, for raising and lowering the gate. As illustrated in FIGURE 1, the gate may be provided with an internally threaded drive nut 38, which is retained by the upper portion of the gate and which coacts with threads 40 on the stem 36 to reciprocate the gate member upon rotation of the stem 36. The attachment between the stem and the gate may be fixed or rigidly connected and vertical stem movement may be effected by a handwheel which threadedly receives the upper portion of the stem, as illustrated in Patent No. 3,054,595 to McKinney. Obviously, anyone of numerous well-known manual or power operated means of achieving vertical stem reciprocation may be incorporated into this invention without departing from the spirit or scope hereof.

The bonnet assembly 14 forms a closure for the valve chamber 28 and is provided with a bore 42 through which the stem 36 passes and a chamber 44 for retaining a packing and bearing assembly. Packing material, which may be plastic or other suitable similar solid materials, is retained in the chamber 44 and about the stem 36 by a packing retainer bushing and serves to provide a fluid-tight seal between the stem 36 and the bonnet 14. A packing fitting assembly 52 is threadedly attached to the bonnet and is adapted to force the packing material into the chamber 44 surrounding the stem 36. Upper and lower thrust bearings 56 are positioned within the chamber and about the stem 36 on either side of an enlarged diameter collar portion 58 of the stem 36, and serve to retain the stem against vertical movement and simultaneously to reduce the torque required to rotate the stem. The bearings 56 are prevented from excessive vertical movement by an adjustable bearing assembly retainer 59 and a lock nut 60. Rotational movement of the stem 36 is effected by rotating a handwheel 62, which is positioned at the upper extremity of the stem 36 or may be rotated by anyone of numerous power valve operators.

Figure 2:
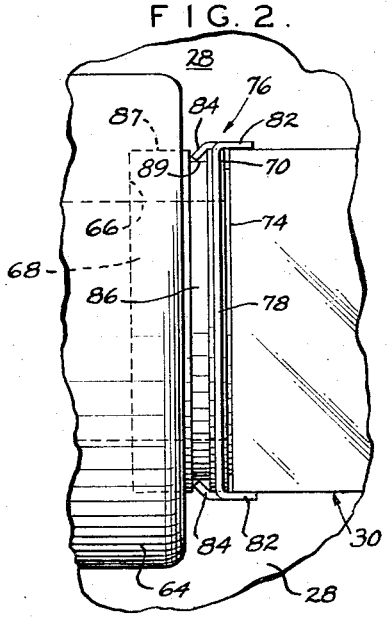
FIGURE 2 is a partial sectional view taken along line 2—2 of FIGURE 1 illustrating the valve seat and gate guide relationship with the gate.

The valve body member 12 is formed with opposed internal bosses 64, which protrude into the valve chamber 28, and which are bored concentrically with the bore 26 to define aligned facing seat recesses 66. In each of the recesses 66 is positioned a seat ring member 68, having an internal diameter 69 of the same dimension as the diameter of the valve bore and which may be a single annular ringlike member as illustrated in FIGURE 2, which is press-fitted within the recess. The seat ring may also be formed of two or more annular ringlike portions and may be pressure actuated into the sealing engagement with a slab type gate valve. Many different seat constructions may be employed without changing the spirit or scope of this invention. An inwardly facing sealing surface 70 on each of the ringlike sealing members 68 is provided for sealing contact with the respective working surface 72 of the gate under extremely high pressure conditions and a plastic sealing ring member 74 is fixed in an annular groove formed in the sealing face of the seat ring for engagement with the working surface 72 of the gate 30. An annular back face sealing member 75 is positioned in an annular chamber defined by the recess 66 and a reduced diameter portion 77 of the seat.

In accordance with this invention a gate guide member 76 (FIGS. 3, 4 and 5) formed of light sheet material such as sheet steel for example, is supported by each of the seat members, as illustrated in FIGURE 2, and serves to prevent sidewise movement of the gate member relative to the bore 26. The gate guide member 76 comprises a generally planar body portion 78 having an opening formed therein. The opening is defined in part by opposing curved surfaces 80 and 81 which are so spaced that the peripheral surface of the seat member is loosely received therebetween. Opposing edge portions of the planar surface 78 are bent substantially normal to the planar surface of body 78 and present parallel planar gate guide flanges 82, which are spaced apart a slightly greater distance than the thickness of the gate member and which retain the gate member against lateral movement without any appreciable frictional contact with the gate member. A pair of opposed locking flanges 84 are formed integral with the planar gate guide flanges 82 and extend in a direction generally opposite to the guide flanges 82. Each of the locking flanges 84 are disposed in angular relationship with the guide surfaces 82 and with the planar surface 78, and extend into an annular groove 86 formed in the seat ring 68 to prevent separation of the guide and seat ring.

Figure 5:
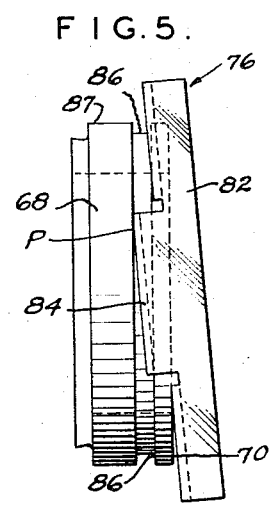
FIGURE 5 is a left side elevational view of the novel seat and gate guide of FIGURE 3 illustrating assembly and disassembly of the seat and guide.

Referring now to FIGURE 5, the annular groove 86 is formed in the exterior peripheral surface 87 of the seat ring 68 and has a generally rectangular cross sectional shape defining a generally cylindrical bottom surface 88, which is generally concentric with the exterior peripheral surface 87 of the seat ring and which is bounded by opposing annular substantially planar radial surfaces 90 and 92. The planar locking flanges are so disposed within the groove 86 that the inner surface 94 thereof has point contact 89 at the point of tangency between the circular edge formed at the juncture of the radial surface 92 with the exterior peripheral surface 87. The fit between the guide 76 and the seat ring 68 at the point of contact 89 is quite tight to assure positive precise alignment between the guide and seat ring. When the guide and seat ring are assembled, the inner edge 96 of the locking flange 84 will be disposed closely adjacent the cylindrical bottom surface 88 of the groove 86, and is adapted upon the application of severe forces to engage the cylindrical surface 88 at the point of tangency therewith to lend additional lateral support against movement of the guide relative to the seat ring. The outer edge of the guide flange 84 is disposed closely adjacent the radial surface 90 of the groove 86 and is adapted for line contact with the radial surface 90 to prevent or to limit axial inward movement of the guide member toward the seat ring.

Figure 7:
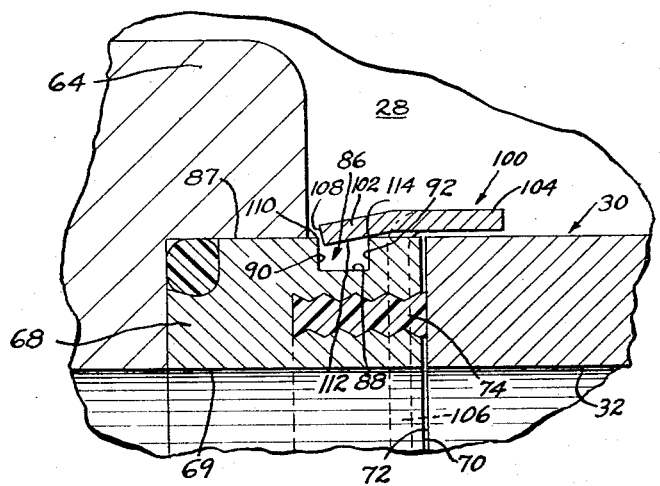
FIGURE 7 is a partial plan view of a valve and valve seat provided with a modified embodiment of the invention.

With reference now to FIGURE 7, a modified embodiment of the invention is illustrated which incorporates a gate guide structure 100 formed from relatively thick sheet metal stock. Because of the thickness of the sheet stock a locking flange 102 is formed thereon which is angularly disposed relative to a guide flange 104 and a planar body portion 106 only an amount sufficiently to allow point of tangency engagement between a planar stop surface 108 defining a lateral edge of the locking flange and a circular edge 110 of the groove 86 defined by the juncture of the planar surface 90 with the exterior peripheral surface 87 of the seat ring 68. Engagement between the edge 110 and the surface 108 serves effectively to prevent excessive movement of the guide member 100 toward the seat ring 68. Excessive movement of the gate guide 100 in a direction away from the seat ring 68 is effectively prevented by the inner surface 112 of the guide which will engage the circular edge 114 to provide a stop for the guide member. Effective control of the gate guide member can, therefore, be obtained regardless of the thickness of the stock from which the guide is formed.

Figure 3:
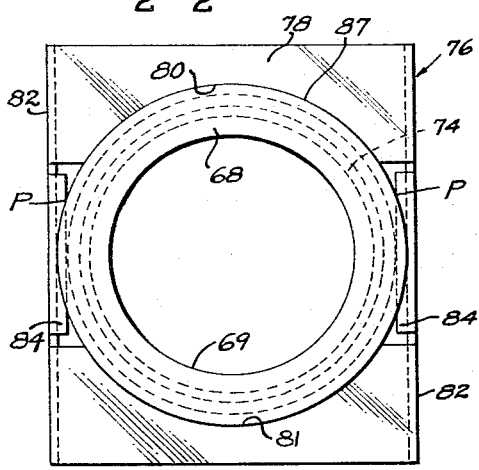
FIGURE 3 is an elevational view illustrating the novel seat member and valve guide of FIGURE 1 in assembly.
Figure 4:
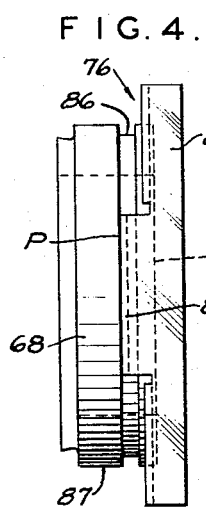
FIGURE 4 is a left side elevational view illustrating the novel seat member and valve guide member of FIGURE 3.

Referring now to FIGURES 3, 4 and 5, pivot points P are defined at the intersection of the inner edge 96 of the locking flange 84 and the exterior peripheral surface 87 of the seat ring 58. The groove 86 of the seat ring 68 is of sufficient width relative to the width of the flange 84, to allow the flange 84 to pivot within the groove 86 about the pivot point P, as illustrated in FIGURE 5. This allows a portion of the planar body portion 78 of the guide 76 to pivot forwardly of the sealing face 70 of the seat ring to a position where the guide 76 may be lifted radially of the seat ring 68 to separate the guide and seat ring. This action is reversed on the assembly of the guide 76 to the seat ring 68. In assembling the guide to the seat the guide is canted in the position illustrated in FIGURE 7 and slipped over the seat ring 68 in such a manner that the locking flanges 84 enter the groove 86 in a canted position. When the generally curved surface 80 in the planar body portion 78 of the guide 76 is substantially aligned with the exterior peripheral surfaces of the seat ring, the guide is then rotated about the pivot point P to the position illustrated in FIGURE 4. When employing gate guide members 76 with pressure actuated seat rings which fit loosely within seat recesses formed in the valve body the guide members may be pre-assembled to the seat rings in the manner described hereinabove and the guide and seat assembly may be inserted into the correct position within the seat recesses immediately prior to installation of the gate and bonnet assembly. When employing gate guide structures 76 with press-fitted seats, the seats generally will be press-fitted into correct position prior to installation of the guide members thereon. The guide members are easily inserted and are removed without the use of tools either while the seats are in position in the valve or when the seats are separated from the valve.

Figure 6:
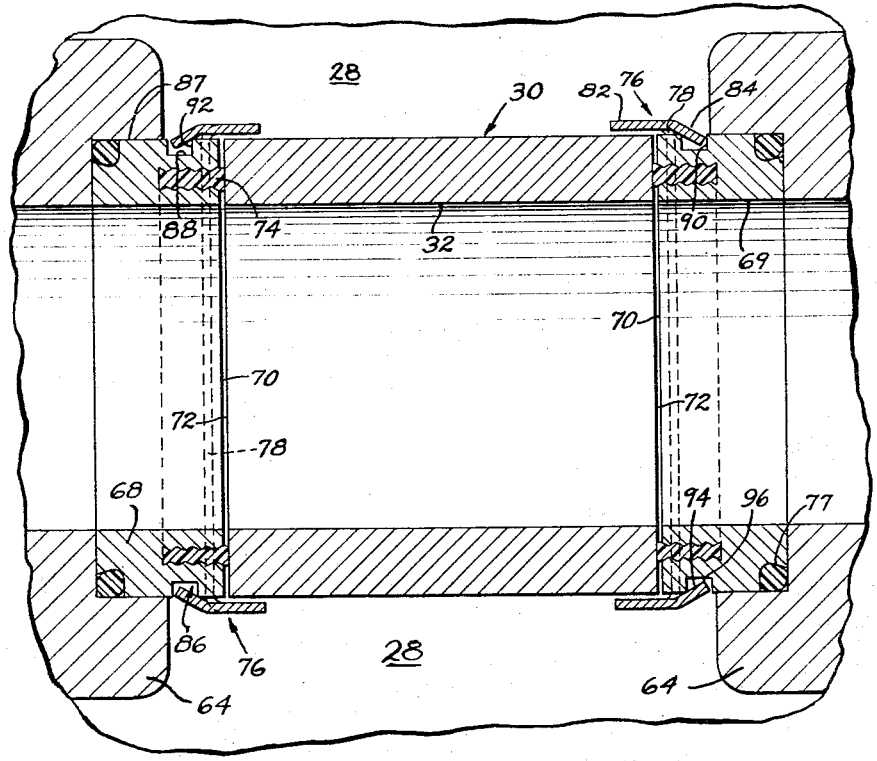
FIGURE 6 is an enlarged partial plan view in section of the valve of FIGURE 1, illustrating the novel valve guide member in accordance with this invention.

After the valve seat and gate guide structures are positioned within the valve chamber, the gate member 30 is positioned between the valve seats and between the guide flanges 82 of each of the valve guides 76. The bonnet assembly 14, to which the gate is generally attached during installation, is fixed then to the annular flange portion 15 of the valve body by the bolts 16. Correct alignment of the guide members, seat members and gate during installation is assured by the close fit between the gate and gate guides. If the guide should accidentally become dislodged from its position on the seat ring 68, such that a portion of the guide extends beyond the sealing face of the seat ring, as illustrated in FIGURE 5, the gate member upon being inserted between the seat rings will contact the guide member and the gate will bind on the guide member thereby preventing further insertion of the gate. Installation of the gate member into its proper position between the seat rings 68 cannot be accomplished with the gate guide members out of position, and the bonnet 14 cannot be properly installed on the body flange 15 if the gate is not in proper position. After the valve has been properly assembled with the seats and guides of this invention properly in place, the gate member 30 will be properly aligned with the flow passage 26 of the valve by the flanges 82 of the guide 76. Lateral movement of the gate 30 in either direction is prevented by the guide flanges 82. When the gate 30 is positioned between the valve seats 68 with the guides 76 properly installed on the valve seat 68, it is impossible for the guides to become dislodged from the seat 68. Because the gate guide 76 can only be removed from the seat 68 by pivoting, as illustrated in FIGURE 5, the guides and seats cannot become disassembled because the gate 30 prevents pivotal movement of the guides on the seat rings. As discussed above in regard to FIGURES 6 and 7, axial movement of the guide members relative to the seat rings is effectively prevented by the relationship of the locking flanges 84 with the annular groove 86 of the seat ring 68. Axial movement of the guide members away from the gate 30 is effectively prevented by contact between the outer edge portion 93 of the locking flange 84 and the radial surface 90 of the groove 86. Axial movement of the guide member toward the gate is effectively prevented by contact between the circular edge 89 of the groove 86 and the inner surface 94 of the locking flange 84.

In view of the foregoing, it is seen that I have produced novel valve seat and gate guide structure for a valve which effectively prevents misalignment between the gate and flow passages during operation of the valve. It is also seen that I have provided a simple reliable valve seat and gate guide arrangement which prevents assembly of the same into a valve unless the parts are properly positioned prior to assembly. The gate guide structures cannot be damaged by the gate as it moves from one position to another position because of the unique guide construction and seat-guide relationship. The gate guide structures of this invention may be easily removed from the seat rings without the use of tools and with a minimum of effort. The invention, therefore, is one well adapted to attain all of the objects hereinabove set forth, together with other advantages which are obvious and inherent from the description of the apparatus itself.

It will be understood that certain features and subcombinations are of utility and may be employed without reference to other features and subcombinations.

This is contemplated by and is within the scope of the claims. As many possible embodiments may be made of the invention without departing from the spirit or scope thereof, it is to be understood that all matters hereinabove set forth or as shown in the accompanying drawings are to be interpreted as illustrative and not in a limiting sense.

I claim:

1. A seat and gate guide assembly for a valve having flow passages and a reciprocating gate having parallel sealing surfaces for controlling flow of fluid through the flow passages, said assembly comprising a generally cylindrical seat ring having a bore formed therein for alignment with the flow passage, a substantially planar annular sealing face on the seat ring for sealing engagement with the sealing surfaces of the gate, a groove formed in the outer periphery of the seat ring, a gate guide member having a body portion fitted about the outer periphery of the seat ring, a pair of gate guide flanges on the body portion and extending substantially normal thereto, a pair of locking flanges on the gate guide flange portions and extending therefrom in angular relation with the body portion and with the guide flanges, the locking flanges extending into the groove to prevent axial movement of the body portion relative to the seat ring.

2. A seat and gate guide assembly for a valve having flow passages and a reciprocating gate having parallel sealing surfaces for controlling flow of fluid through the flow passages, said assembly comprising a generally cylindrical seat ring having a bore formed therein for alignment with the flow passages, a substantially planar annular sealing face on the seat ring for sealing engagement with the sealing surfaces of the gate, an annular groove formed in the outer periphery of the seat ring, a removable gate guide member having a generally planar body portion closely fitted about the outer periphery of the seat ring, a pair of generally planar parallel gate guide flanges integral with the body portion and extending substantially normal thereto, a pair of generally planar opposed locking flanges formed integral with the gate guide flange portions and extending therefrom in angular relation with the body portion and with the guide flanges, the locking flanges extending into the annular groove to prevent axial movement of the body portion relative to the seat ring and being substantially thinner than the width of the groove to allow sufficient pivotal movement of the body portion on the seat ring to move a portion of the planar body portion axially past the respective sealing face of the seat ring whereby the gate guide may be moved radially to disassemble the gate guide member from the seat ring.

3. A gate valve comprising a valve body having a valve chamber formed therein, flow passages formed in the valve body and being in communication with the valve chamber, a gate valve member having parallel planar sealing surfaces thereon and having a through passage formed therein disposed within the valve chamber and being movable from a closed position where the gate blocks the flow passages to an opened position where the through passage is aligned with the flow passages, seat recesses formed in the valve body about each of the flow passages, a seat ring positioned in each of the seat recesses and having a substantially planar annular sealing surface thereon, and an annular groove formed in the outer periphery thereof, a substantially planar body portion having a generally circular opening therein adapted to fit about the exterior periphery of the seat ring, a pair of parallel gate guide flanges formed integral with the body portion and extending substantially normal thereto and adapted to retain the gate against sidewise movement relative to the seat ring, a pair of opposed locking flanges formed integral with the guide flanges and being disposed in angular relation with the body portion and with the guide flanges, the locking flanges adapted to be disposed within the groove to retain the body portion against movement toward or away from the gate and being substantially thinner than the width of the groove to allow sufficient pivotal movement of the body portion on the seat ring to allow a portion of the body to move axially past the sealing surface of the seat ring whereby the body may be moved radially for disassembly from the seat ring.

4. A seat and gate guide assembly for a gate valve comprising an annular seat ring having a groove formed in the exterior peripheral surface thereof, a gate guide member positioned about the seat ring and having one or more gate guide flanges extending therefrom, a locking member extending from each of the guide flanges and extending into the annular groove to loosely lock the guide member against inadvertent separation from the seat ring.

5. A seat and gate guide assembly for a gate valve comprising an annular seat ring having an annular groove formed in the exterior peripheral surface thereof, a gate guide member positioned about the said exterior peripheral surface and having a pair of generally planar gate guide flanges extending therefrom, at least one locking member extending from each of the guide flanges and extending into the annular groove to lock the guide member against axial separation from the seat ring.

6. A seat and gate guide assembly for a gate valve comprising an annular seat ring having an annular groove formed in the exterior peripheral surface thereof, a gate guide member having a planar body portion thereof positioned about the said exterior peripheral surface and having a pair of generally planar gate guide flanges extending therefrom and disposed generally normal thereto, a locking member extending from each of the guide flanges in angular relation with both the planar body portion and the respective guide flange and extending into the annular groove to lock the guide member against axial separation from the seat ring.

7. A seat and gate guide assembly for a gate valve comprising an annular seat ring having an annular groove of generally rectangular cross section formed in the exterior peripheral surface thereof, a gate guide member having an annular opening therein adapted to be positioned about said exterior peripheral surface and having a pair of substantially planar parallel gate guide flanges integral therewith and extending therefrom, a substantially planar locking flange extending from each of the guide flanges and disposed in angular relation with the body portion and with the respective guide flanges and adapted to extend into the annular groove to loosely lock the guide member against inadvertent separation from the seat ring, the locking flanges being substantially thinner than the width of said groove whereby the locking flanges may be pivoted within the groove.

8. A seat and gate guide assembly for a gate valve comprising an annular seat ring having an annular groove formed in the exterior peripheral surface thereof, a gate guide member having an annular opening therein adapted to be positioned about said exterior peripheral surface and having a pair of substantially planar parallel gate guide flanges integral therewith and extending therefrom, a substantially planar locking flange extending from each of the guide flanges and disposed in angular relation with both the body portion and the respective guide flange and adapted to extend into the annular groove to loosely lock the guide member against inadvertent separation from the seat ring, the locking flanges having tangent contact with the circular edge of the groove to prevent axial outward movement of the guide relative to the seat ring and having line contact with a wall of the groove to prevent axial inward movement of the guide relative to the seat ring.

References Cited by the Examiner

UNITED STATES PATENTS

| 1,803,889 | 5/1931 | Bohnhardt et al. | 251—196 |
| 2,796,230 | 6/1957 | Grove et al. | 251—328 X |

M. CARY NELSON, *Primary Examiner.*

ARNOLD ROSENTHAL, *Examiner.*